United States Patent [19]

Simms

[11] Patent Number: 4,866,285
[45] Date of Patent: Sep. 12, 1989

[54] INFRARED FLASH UNIT

[75] Inventor: Robert A. Simms, Phoenix, Ariz.

[73] Assignee: Murasa International, Long Beach, Calif.

[21] Appl. No.: 208,458

[22] Filed: Jun. 20, 1988

[51] Int. Cl.$^4$ ............................................. H05B 41/30
[52] U.S. Cl. .............................. 250/495.1; 250/504 R;
          250/504 H; 250/333; 354/413; 430/494
[58] Field of Search ............ 250/495.1, 504 R, 504 H,
                                    250/333; 354/413

[56] References Cited

U.S. PATENT DOCUMENTS

| | | | |
|---|---|---|---|
| 3,752,983 | 8/1973 | Yanez | 250/333 |
| 4,610,525 | 9/1986 | Yoshida et al. | 354/415 |
| 4,707,595 | 11/1987 | Meyers | 250/504 R |

Primary Examiner—Jack I. Berman
Attorney, Agent, or Firm—LaValle D. Ptak

[57] ABSTRACT

An infrared flash unit, for use with camera employing infrared film, is mounted in a housing having a base configured to fit on the normal flash unit attachment of a standard camera. The housing has a front panel with an array of eight individual reflectors, each having an infrared light emitting diode or laser diode in it. A power supply is connected through a pulse driver circuit to the diodes, each of which are connected in series with a corresponding switch. The diode and switch combination are connected in parallel with one another and in series with the pulse driver circuit. Different combinations of diodes are selected for operation in accordance with the shutter speed and range of the camera. The pulse driver circuit supplies energizing pulses to the selected diodes at a repetition rate and duty cycle selected to match the primary infrared wave length of the diodes and the film used in the camera to reduce fogging due to background infrared light.

17 Claims, 2 Drawing Sheets

INFRARED FLASH UNIT

BACKGROUND

Flash lamp attachments are widely used with cameras of various types to provide sufficient illumination in low light conditions to match the exposure characteristics of the film used in the camera. Standard cameras, such as the popular 35MM cameras, generally have a flash attachment "shoe" in the form of a conductive bayonet plate fitting on the top of the camera. Different types of flash guns, or flash lamp devices, are mounted on this shoe with a mating bayonet fitting. These fittings are standardized, and the camera fitting is connected with the shutter mechanism of the camera to complete an electrical circuit upon the tripping or release of the shutter. Completion of this electrical circuit then is used in the flash gun itself to complete a circuit through a battery power supply to the flash lamp. The flash lamp may be in the form of a flash bulb, which is consumed when it is triggered, or it may be an electronic flash which is capable of a large number of repeated operations before it needs replacement.

For taking pictures in dim light conditions, the lens opening of the camera is adjusted in accordance with the film speed parameters and the characteristics of the flash lamp. Typically, when a camera is used for taking flash pictures, a single shutter speed (such as 1/60th of a second) is employed, and adjustments are made in the lens opening for establishing the correct amount of exposure for the film when the subject is at different distances from the camera. Only a single flash lamp is provided in the flash gun unit, and the unit itself usually has a chart on the back panel which enables the user to correlate the film speed, distance from subject, and the camera lens opening for the proper exposure. In some professional applications, satellite flash units located at a distance from the one on the camera are used to supplement the light from the camera and to provide light from different angles. Such satellite units include sensors which cause them to be triggered by the light from the primary flash unit on the camera. This results in nearly instantaneous triggering of all of the flash units to provide the desired lighting.

Infrared film has been developed for 35MM cameras to permit them to be used in extremely low light conditions to detect infrared radiation from objects to be photographed. Such film typically has a primary infrared frequency of response. The camera may be equipped with a filter to pass frequencies of light in the infrared region and a block out light frequencies in the visible region to insure proper exposure of the film and to eliminate undesirable effects which could be caused by visible light leakage. Infrared film, however, is limited in its applications to photographing objects which emit radiation at the infrared frequencies corresponding to the sensitivity or response characteristics of the film. Consequently, applications for photographing objects with such infrared film have been somewhat limited.

It is desirable to provide a device which permits a camera to be used with infrared film for photographing objects in low infrared light conditions even when the objects do not naturally radiate infrared signals in the spectrum of sensitivity of the film. It is desirable to provide a unit which is simple in operation, relatively inexpensive in cost and which is versatile for accomplishing this purpose.

SUMMARY OF THE INVENTION

It is an object of this invention to provide an improved flash system for cameras.

It is another object of this invention to provide an improved flash system for cameras using infrared film.

It is an additional object of this invention to provide an improved covert flash system for cameras.

It is a further object of this invention to provide an improved infrared flash system for use with cameras to record images on infrared film.

It is yet another object of this invention to provide an improved multi-element infrared flash system for cameras to record images on infrared film.

In accordance with a preferred embodiment of this invention, an infrared flash unit for use with a camera has a flash unit housing for mounting on the standard flash base of a camera. At least one infrared diode light source is located in the front of the housing, which also includes a power supply for energizing the light source. A pulse driver circuit is connected between the power supply and the light source for supplying electrical pulses to the light source at a predetermined frequency, and a switch is connected to the pulse driver circuit to operate that circuit to supply a predetermined number of operating pulses to the light source in response to the operation of the shutter to the camera.

DETAILED DESCRIPTION

Figure 1:
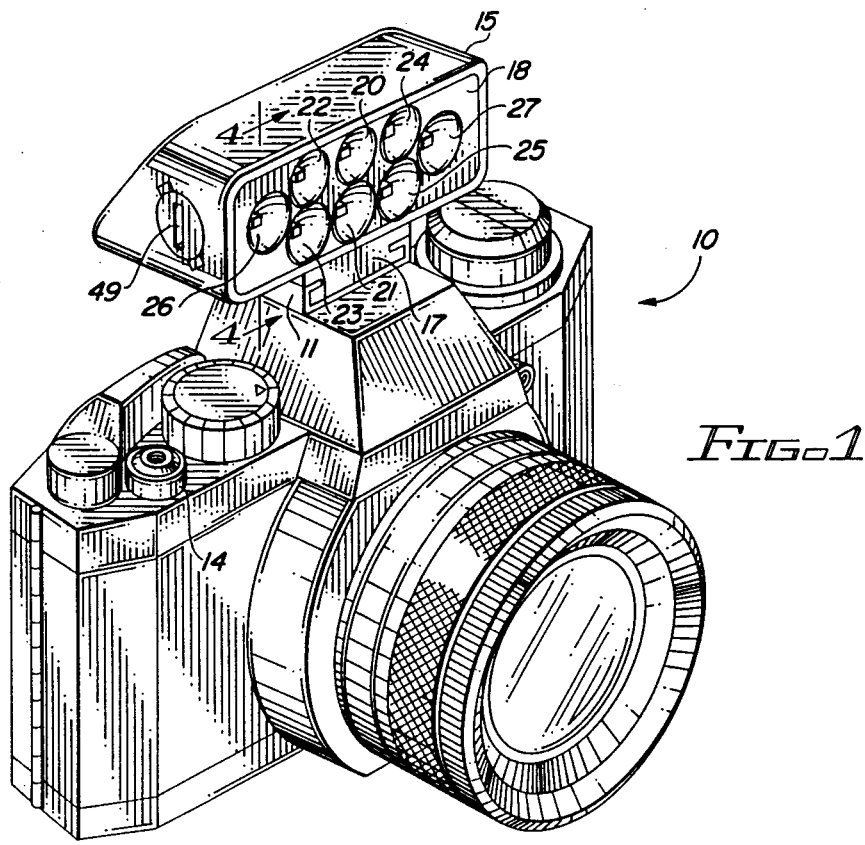
FIG. 1 is a front perspective view of a camera having a flash unit, made in accordance with a preferred embodiment of the invention, mounted on it.

Reference now should be made to the drawings in which the same reference numbers are used throughout the different figures to designate the same or similar components. FIG. 1 shows a standard 35MM camera 10, which typically has a flash attachment base 11 mounted on the top and which includes a shutter release button 14 for triggering the shutter to expose film in the camera through the lens system. The details of the lens system, the manner in which it is focused, and the adjustments of the lens aperture, along with other mechanism of the camera is not discussed here. With some minor variations, all 35MM cameras operate in substantially the same way, and no modification of the basic operation of a standard 35MM camera is necessary to employ the infrared flash unit of the preferred embodiment of the invention.

It should be noted that when the shutter release button 14 is depressed, a circuit is completed or closed to the flash unit base 11 mounted on the top of the camera; so that any time a flash gun unit of any type compatible with the camera is mounted on the base 11, the flash lamp in the flash gun unit may be energized from the battery power supply of such a flash unit. The manner in which the internal switch circuit in the flash unit is completed is not important; but for the purposes of the description of the preferred embodiment of this invention, it is sufficient to note that such a flash gun circuit is completed by the operation of the shutter in all commonly available 35MM cameras and many other types of cameras.

As illustrated in FIG. 1, a flash unit 15 having a mating base 17 for engagement with the bayonet shoe 11 on the top of the camera is provided. This unit is used when the camera 10 is loaded with infrared film. The manner in which the base 17 engages the bayonet mount 11 on the camera top is a conventional interconnection common to all types of bayonet flash attachments for cameras of the type shown in FIG. 1. An electrical circuit is completed through the base 17 to the camera shutter release switch, described previously, in the internal circuitry of the flash unit 15; so that flash lamps in the unit 15 are energized anytime the unit is mounted on the camera and the shutter release button 14 is depressed by an operator of the camera 10.

Figure 2:
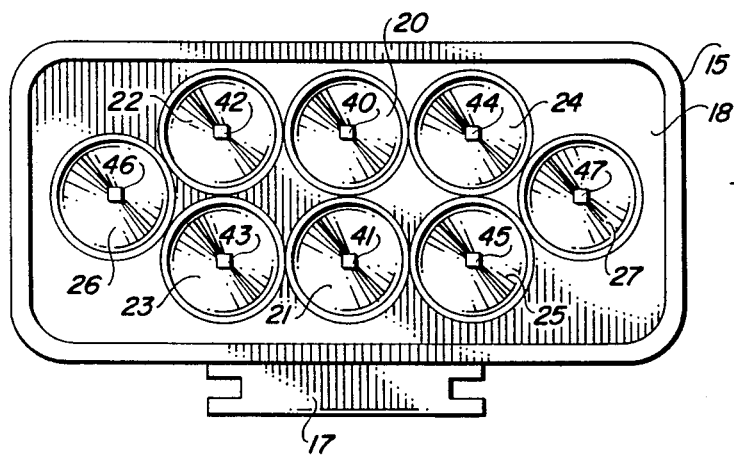
FIG. 2 is a front view of the flash unit of FIG. 1.

The unit 15 differs from a standard flash unit by the provision of an array of infrared flash lamps in place of the single flash lamp of a standard visible light spectrum electronic flash or flash bulb typically used with cameras of the type shown in FIG. 1. This infrared lamp array is shown most clearly in FIG. 2, which is a front view of preferred embodiment of the invention. It can be seen that there are eight reflectors 20 through 27 located in two parallel rows, with the end reflectors 26 and 27 located at the ends of the two parallel rows half way between them. Each of the reflectors 20 through 27 has a corresponding infrared diode lamp 40 through 47 located at the focal point of the reflector. The array illustrated in FIG. 2 is greater than actual size, and each of the reflectors 20 through 27 in an actual working embodiment has a diameter of one forth (¼) inch. The overall width of the entire flash unit is approximately two inches with a vertical heighth of approximately three forths (¾) inches above the base 17. Thus, it can be seen that the individual reflectors 20 through 27 are quite small in size.

Figure 3:
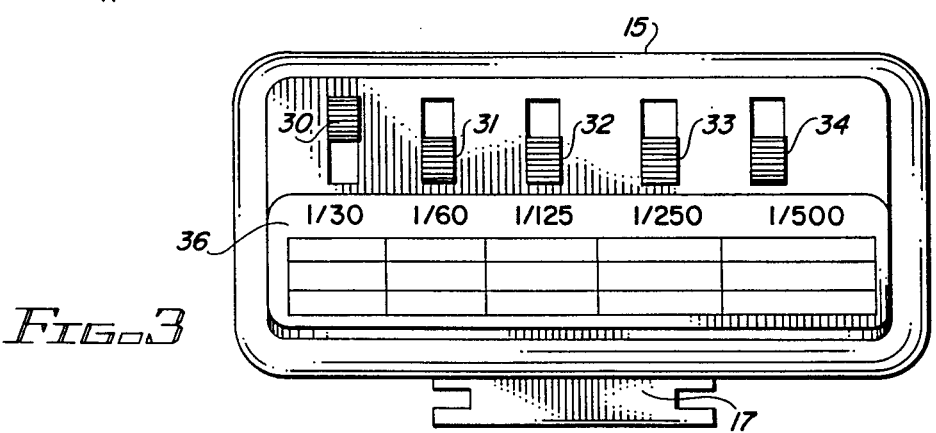
FIG. 3 is a rear view of the flash unit of FIG. 1.

FIG. 3 shows the back side of the flash unit 15 and illustrates a set of five slide switches, 30 through 34, located in a parallel row across the top of the unit. The switches 30 through 34 are used to select the particular number of the diodes 40 through 47 which are to be energized during the operation of the flash unit. For example, as shown in FIG. 3, the switch 30 is illustrated as moved to its uppermost position, whereas all of the other switches 31 through 34 are shown in their lowermost position. When all of the switches 30 through 34 are in the lowermost position, the flash unit is inactivated and does not operate in response to operation of the shutter release button 14 on the camera 10.

When the switch 30 is in its uppermost position, only one of the diodes, the diode 40 in the reflector 20, is enabled for operation. When the switch 31 is in its uppermost position (irrespective of the position of the switch 30) the diodes 40 and 41 (the two located one above the other in the array of FIG. 2) are enabled for operation. Similarly, when the switch 32 is in its uppermost position, the diodes 40, 41, 42, and 44 are enabled for operation. When the switch 33 is in its uppermost position, the six central diodes 40, 41, 42, 43, 44 and 45 are enabled for operation, and finally, when the switch 34 is in its uppermost position, all eight of the diodes 40 through 47 are enabled for operation.

The selection of one or more of the diodes 40 through 47 for operation at any given time provides an added dimension of control over the exposure of the infrared film in addition to adjustments of the lens opening of the camera for any given distance. In addition, operation of the camera at different shutter speeds (for example 1/30th of a second to 1/500th of a second) may be employed in contrast with a conventional 35MM flash attachment which typically is operated at only one shutter speed, usually 1/60th of a second.

The rear of the flash unit 15 also may include an exposure chart 36 which provides exposure information for various shutter speeds, including the camera lens openings for different numbers of energized infrared diode light sources. The actual information on the chart 36 has not been provided since it would unncessarily clutter the drawing, but typical shutter speed/distance/aperture opening/enabled infrared diodes may be indicated on the chart 36 on the flash unit in a manner similar to comparable data on the charts of typical standard visible light flash units.

Figure 4:
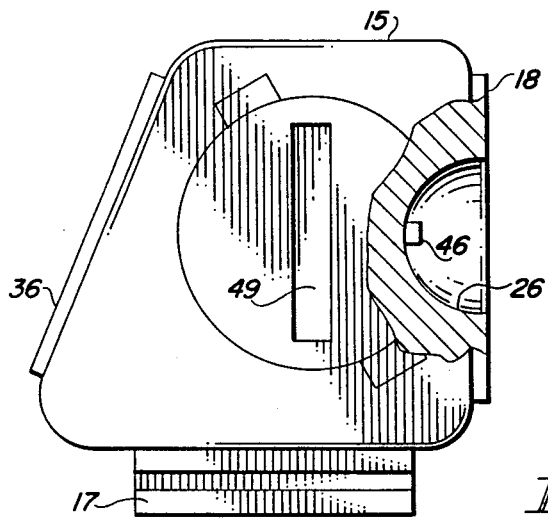
FIG. 4 is a partially cut-away side view of the flash unit of FIG. 1.

As illustrated in FIG. 4, the flash unit 15 has a rotatable cover 49 located on one side to permit replacement of the battery power supply in the unit. The unit also includes electronic circuitry of the type shown in FIG. 5 for operating the unit. FIG. 4 shows the configuration of one of the eight lenses, the lens 26, with its associated infrared diode 46, to illustrate the manner in which the various lenses are located in the front face 18 of the flash unit.

Figure 5:
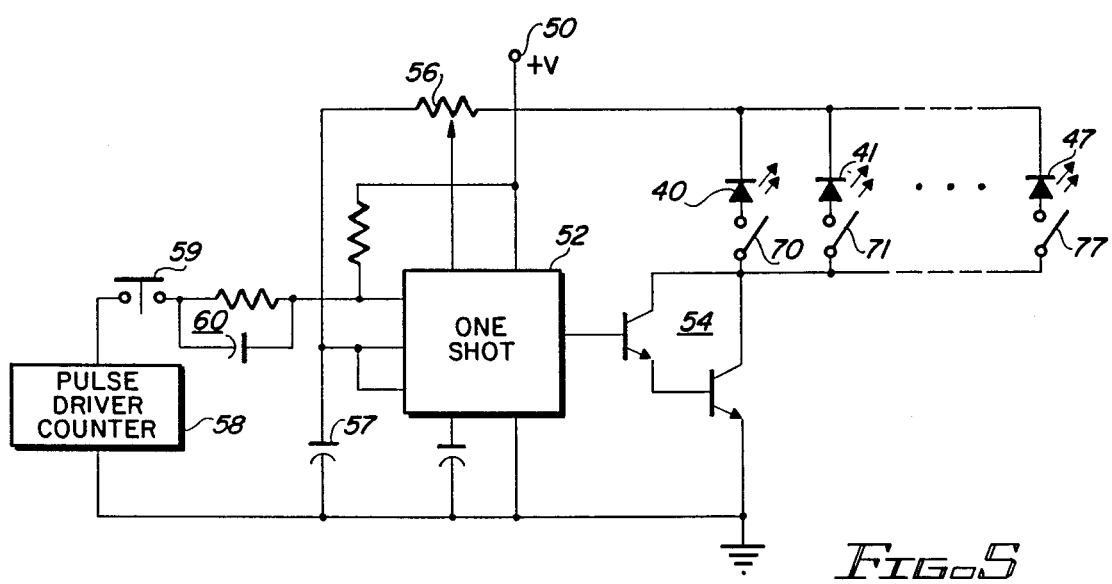
FIG. 5 is a schematic circuit diagram of the operating circuit of a preferred embodiment of the invention.

Reference now should be made to FIG. 5, which is a schematic circuit diagram of the operating circuit for the flash unit shown in FIGS. 1 through 4. This circuit differs from the circuit of a typical visible light flash unit which produces a single flash of light each time the shutter release button 14 is depressed. Instead of producing a single flash each time the shutter is operated by the button 14, the selected infrared light emitting diodes or infrared laser diodes 40 through 47, which may be employed in conjunction with the reflectors 20 through 27, are provided with pulses of operating power at a rate which matches the characteristics of the wave length of the infrared film used in the camera. These pulses are of uniform dwell time and duty cycle, and the number of pulses is increased with the distance of the object being photographed for any given number of selected infrared diodes 40 through 47.

As shown in FIG. 5, the actual pulsing of the diodes 40 through 47 is effected by a one-shot multivibrator 52, supplied with a source of operating direct current potential from a source 50. The output of the one-shot multivibrator 52 is supplied to a cascaded pair of NPN amplifier transitors 54 connected to the lower contact of a set of switches 70 through 77. Each of the switches 70 through 77 is connected, respectively, in series with a corresponding one of the light emitting diodes or laser diodes 40 through 47 to complete a circuit through the selected diodes from the power source 50 to ground.

The switches 70 through 77 are operated by means of the operation of the slide switches 30 through 34 on the back of the flash unit housing 15. When the slide switch 30 on the housing is moved to the position shown in FIG. 3, the switch 70 is closed and the remaining switches 71 through 77 are open. Thus, only the diode 40 is provided with operating power by the operation of the one shot multi-vibrator in this mode of operation.

When the switch 34 is moved to its uppermost position, all of the switches 70 through 77 are closed by means of a suitable linkage (not shown) to enable energization of all of the diodes 40 through 47. The one shot multi-vibrator 52 operates in the same manner irrespective of the number of diodes 40 to 47 which are selected for energization in accordance with the setting of the switches 30 through 34 (and through these switches, the switches 70 through 77).

Normally the one-shot multivibrator 52 is in a standby mode of operation and does not produce any output pulses for driving the transistor amplifier pair 54. When the camera shutter release button 14, however, is operated, a circuit is closed through a switch 59 (FIG. 5) which connects the trigger input of the one-shot multivibrator 52 through a pulse driver counter circuit 58 to complete an operating circuit path for the trigger input of the one-shot multivibrator 52. The switch 59 remains closed for the duration of the opening of the shutter of the camera which, in turn, permits a pre-established number of pulses from the pulse driver counter circuit 58 to be applied to the trigger input of the multivibrator 52. Each of the these pulses causes the multivibrator 52 to produce an output pulse of relatively short duration to cause a "flash" energization of whichever one or ones of the infrared diodes 40 through 47 are conneced (through closed ones of the switches 70 to 77) for energization at that time.

Figure 6:
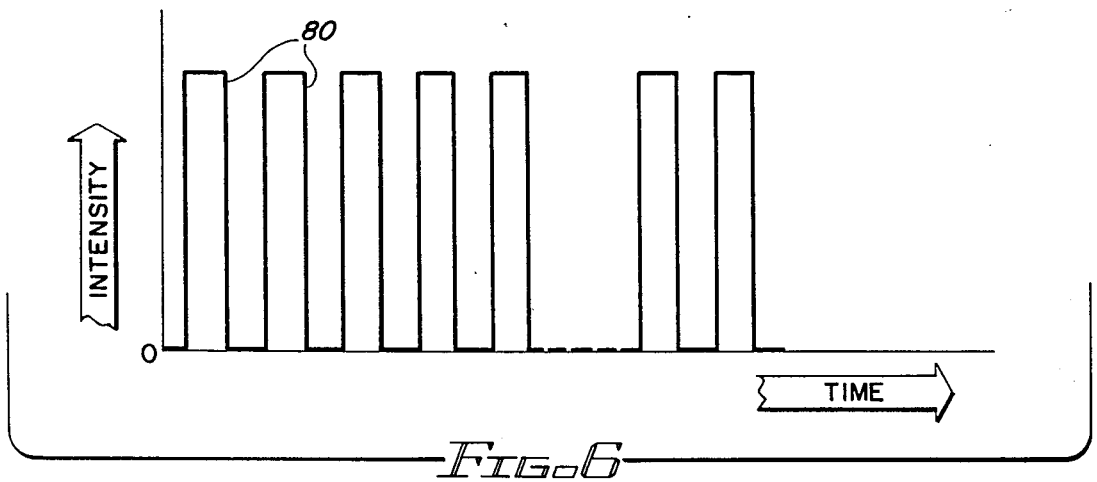
FIG. 6 is a waveform useful in illustrating the manner of operation of the flash unit of FIGS. 1 through 5.

FIG. 6 shows a typical series of pulses 80 produced by the pulse counter circuit 58, and each of the pulses 80 has relatively sharp rise and fall times, with uniform intensity. The output of the multivibrator 52, as supplied through the amplifier transistor stage 54, is a duplication of the waveform comprising the pulses 80 shown in FIG. 6. Consequently, the enabled infrared diodes 40 through 47 flash at a relatively high rate during the time the shutter is opened until no further trigger pulses are applied from the one-shot multivibrator 52. The number of actual pulses or actual flashes which occur is a function of the time during which the shutter of the camera 10 is open, since this is the time interval the switch 59 is closed to permit the trigger pulses to be applied from the pulse driver counter circuit 58 to the trigger input of the one-shot multivibrator 52.

When the pulses of light which are emitted from the selected infrared diodes 40 through 47 occur at a repetition rate which is the same as or is a resonant frequency of the primary infrared wave length to which the infrared film in the camera 10 is sensitive, fogging of the film due to background infrared light is significantly minimized; and the exposure of the film as a result of the infrared reflected light produced by means of the selected one or more of the flash units 20 through 27 (diodes 40 through 47) is enhanced.

The infrared flash unit used with a standard 35MM camera equipped with standard commercially available infrared film, is capable of producing high quality pictures of practically any object at distances of one to ten feet. Objects at greater distances than ten feet from the camera also may be photographed using the infrared flash unit described above, but exposure times are significantly increased, even when the full eight diode array is simultaneously energized.

The tables reproduced below provide information which has been obtained from an actual embodiment of the invention of the type illustrated in FIGS. 1 through 5. Table I below constitutes a distance to exposure matrix to show the flash duration required as a product of the distance and the number of diode emitters (40 through 47) for optimum exposure. The data reproduced on this chart of Table I has the camera lens set at a F1.4 lens opening. The diodes used were either Optronics OD-100 Infrared Light Emitting Diodes (LED) or Sharp LD-20 Laser Diodes (LD) with beam spreading optics. The flash duration was the accumulation of all of the pulses 80 used to produce such optimum exposure. In the actual test run, with the distance to exposure matrix of Table I, photographs were taken of the target object in a completely dark room with an open shutter on the camera. The following data was developed:

TABLE I

| TARGET | EMITTERS | | | | | | | |
|---|---|---|---|---|---|---|---|---|
| | 1 | 2 | 3 | 4 | 5 | 6 | 7 | 8 |
| 1 Foot | 1/30 | 1/60 | 1/120 | 1/250 | 1/500 | 1/1000 | 1/2000 | 1/4000 |
| 2 Feet | 1/15 | 1/30 | 1/60 | 1/120 | 1/250 | 1/500 | 1/1000 | 1/2000 |
| 3 Feet | ½ | 1/15 | 1/30 | 1/60 | 1/120 | 1/250 | 1/500 | 1/1000 |
| 4 Feet | ¼ | ½ | 1/15 | 1/30 | 1/60 | 1/120 | 1/250 | 1/500 |
| 5 Feet | ½ | ¼ | ½ | 1/15 | 1/30 | 1/60 | 1/120 | 1/250 |
| 6 Feet | 1 | ½ | ¼ | ½ | 1/15 | 1/30 | 1/60 | 1/120 |
| 7 Feet | 2 | 1 | ½ | ¼ | ½ | 1/15 | 1/30 | 1/60 |
| 8 Feet | 3 | 2 | 1 | ½ | ¼ | ½ | 1/15 | 1/30 |
| 9 Feet | 4 | 3 | 2 | 1 | ½ | ¼ | ½ | 1/15 |
| 10 Feet | 5 | 4 | 3 | 2 | 1 | ½ | ¼ | ½ |

An exposure matrix has been developed for one to eight diode emitters selected out of the total array of eight to determine the exposure time required as a product of the distance to target and the lens opening. In Table II reproduced below, such information is provided for one diode emitter of the type mentioned above (namely diode 40):

TABLE II

| Target Distance | Lens Opening | | | | | | | | |
|---|---|---|---|---|---|---|---|---|---|
| | F 1.4 | F 2.8 | F 4.0 | F 5.6 | F 8 | F 11 | F 16 | F 22 | F 32 |
| 1 Foot | 1/500 | 1/250 | 1/120 | 1/60 | 1/30 | 1/15 | ½ | ¼ | ½ |
| 2 Feet | 1/250 | 1/120 | 1/60 | 1/30 | 1/15 | ½ | ¼ | ½ | 1 |
| 3 Feet | 1/120 | 1/60 | 1/30 | 1/15 | ½ | ¼ | ½ | 1 | 2 |
| 4 Feet | 1/60 | 1/30 | 1/15 | ½ | ¼ | ½ | 1 | 2 | 4 |
| 5 Feet | 1/30 | 1/15 | ½ | ¼ | ½ | 1 | 2 | 4 | 8 |
| 6 Feet | 1/15 | ½ | ¼ | ½ | 1 | 2 | 4 | 8 | 16 |
| 7 Feet | ½ | ¼ | ½ | 1 | 2 | 4 | 8 | 16 | 32 |
| 8 Feet | ¼ | ½ | 1 | 2 | 4 | 8 | 16 | 32 | 1 Min |
| 9 Feet | ½ | 1 | 2 | 4 | 8 | 16 | 32 | 1 Min | 2 Min |
| 10 Feet | 1 | 2 | 4 | 8 | 16 | 32 | 1 Min | 2 Min | 4 Min |

Different diode emitter arrays from one through eight (1 through 8) have been tabulated, and a linear correlation has been found to exist between the number of energized diodes (or emitters) in the array and the exposure time required as product of distance to target and lens opening. This information for the exposure matrix for an eight diode array is given below in Table III:

TABLE III

| Target Distance | Lens Opening | | | | | | | | |
|---|---|---|---|---|---|---|---|---|---|
| | F 1.4 | F 2.8 | F 4.0 | F 5.6 | F 8 | F 11 | F 16 | F 22 | F 32 |
| 1 Foot | 1/4000 | 1/2000 | 1/1000 | 1/500 | 1/250 | 1/120 | 1/60 | 1/30 | 1/15 |
| 2 Feet | 1/2000 | 1/1000 | 1/500 | 1/250 | 1/120 | 1/60 | 1/30 | 1/15 | 1/8 |
| 3 Feet | 1/1000 | 1/500 | 1/250 | 1/120 | 1/60 | 1/30 | 1/15 | 1/8 | 1/4 |
| 4 Feet | 1/500 | 1/250 | 1/120 | 1/60 | 1/30 | 1/15 | 1/8 | 1/4 | 1/2 |
| 5 Feet | 1/250 | 1/120 | 1/60 | 1/30 | 1/15 | 1/8 | 1/4 | 1/2 | 1 |
| 6 Feet | 1/120 | 1/60 | 1/30 | 1/15 | 1/8 | 1/4 | 1/2 | 1 | 2 |
| 7 Feet | 1/60 | 1/30 | 1/15 | 1/8 | 1/4 | 1/2 | 1 | 2 | 4 |
| 8 Feet | 1/30 | 1/15 | 1/8 | 1/4 | 1/2 | 1 | 2 | 4 | 8 |
| 9 Feet | 1/15 | 1/8 | 1/4 | 1/2 | 1 | 2 | 4 | 8 | 16 |
| 10 Feet | 1/8 | 1/4 | 1/2 | 1 | 2 | 4 | 8 | 16 | 32 |

The foregoing description of a preferred embodiment of the invention is to be considered as illustrative and not as limiting. For example, the particular configuration of the diode array which is illustrated in the preferred embodiment can be modified to a different pattern without departing from the true scope of the invention. In addition, the operating circuit for energizing the diodes can be modified by those skilled in the art, and the manner of locating and operating the switches for selecting the different numbers of diodes for the desired array may be modified without departing from the true scope of the invention as set forth in the following claims.

I claim:

1. An infrared flash unit for use with a camera having a shutter and employing infrared film, said unit including in combinations:
   a flash unit housing for mounting on the camera;
   at least one infrared diode light source in said housing;
   a power supply in said housing;
   pulse driver circuit means connected between said power supply and said light source in said housing for supplying operating pulses to said light source; and
   first switch means connected to said pulse driver circuit means for operating said pulse driver circuit means to supply a predetermined number of operation pulses to said light source in response to operation of the shutter of the camera when said housing is mounted thereon.

2. The infrared flash unit according to claim 1 wherein said housing has a front panel, and further including reflector means behind said diode light source, said reflector means and said light source mounted in said front panel of said housing.

3. The infrared flash unit according to claim 2 wherein said infrared diode light source comprises a light emitting diode (LED).

4. The infrared flash unit according to claim 2 wherein said diode light source comprises a laser diode light source.

5. The infrared flash unit according to claim 2 wherein said pulse driver circuit means includes a one-shot multivibrator having a trigger input terminal, a pulse driver counter, and an output stage, with the output stage thereof connected in series circuit with said infrared diode light source across said power supply, said one-shot multivibrator producing output drive signals to said output stage and said pulse driver counter coupled with the trigger input terminal of said one-shot multivibrator to cause said predetermined number of operating pulses to be supplied from said output stage in response to operation of said one-shot multivibrator.

6. The infrared flash unit according to claim 5 wherein said infrared diode light source comprises an array of eight infrared diodes arranged in a predetermined pattern on the front panel of said housing for projecting light therefrom.

7. The infrared flash unit according to claim 6 further including selecting means for selectively enabling various combinations of said plurality of infrared light sources for operation by said pulse driver circuit means.

8. The infrared flash unit according to claim 7 wherein said selecting means comprises individual switches connected in series with each of said infrared diode light sources, said switches being selectively, manually operable.

9. The infrared flash unit according to claim 8 wherein said infrared diode light sources are arranged in at least two rows.

10. The infrared flash unit according to claim 9 wherein said infrared diode light source comprises a plurality of infrared diode light sources, each connected in series with one of a corresponding plurality of second switch means with each of said diode light sources and its corresponding second switch means being connected in parallel with the others of said light sources and second switch means, and all connected in series circuit with said pulse driver circuit means.

11. The infrared flash unit according to claim 2 wherein said infrared diode light source comprises an array of eight infrared diodes arranged in a predetermined pattern on the front panel of said housing for projecting light therefrom.

12. The infrared flash unit according to claim 11 including selecting means for selectively inteconnecting predetermined ones of said infrared diode light sources in series circuit with said pulse driver circuit means.

13. The infrared flash unit according to claim 12 wherein said selecting means comprises individual switches connected in series with each of said infrared diode light sources, said switches being selectively, manually operable.

14. The infrared flash unit according to claim 13 wherein said infrared diode light source comprises a light emitting diode (LED).

15. The infrared flash unit according to claim 1 wherein said diode light source comprises a laser diode light source.

16. The infrared flash unit according to claim 1 wherein said pulse driver circuit means includes a one-shot multivibrator having a trigger input terminal, a pulse driver counter, and an output stage, with the output stage thereof connected in series circuit with said infrared diode light source across said power supply, said one-shot multivibrator producing output drive signals to said output stage and said pulse driver counter coupled with the trigger input terminal of said one-shot multivibrator to cause said predetermined number of operating pulses to be supplied from said output stage in response to operation of said one-shot multivibrator.

17. The infrared flash unit according to claim 16 wherein said infrared diode light source comprises a plurality of infrared diode light sources, each connected in series with one of a corresponding plurality of second switch means with each of said diode light sources and its corresponding second switch means being connected in parallel with the others of said light sources and second switch means, and all connected in series circuit with said pulse driver circuit means.

* * * * *